(12) United States Patent
Lin

(10) Patent No.: US 9,128,278 B2
(45) Date of Patent: Sep. 8, 2015

(54) DUST CLEANING DEVICE

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 92 days.

(21) Appl. No.: 14/040,499

(22) Filed: Sep. 27, 2013

(65) Prior Publication Data

US 2014/0331441 A1 Nov. 13, 2014

(30) Foreign Application Priority Data

May 7, 2013 (TW) .............................. 102116135 A

(51) Int. Cl.
*G02B 27/00* (2006.01)
*B08B 5/02* (2006.01)
*G02B 7/02* (2006.01)

(52) U.S. Cl.
CPC .............. *G02B 27/0006* (2013.01); *B08B 5/02* (2013.01); *G02B 7/021* (2013.01)

(58) Field of Classification Search
CPC .. G02B 27/0006; G02B 27/021; B41L 21/02; A47L 5/14; E01H 1/0809; A01G 1/125
See application file for complete search history.

(56) References Cited

U.S. PATENT DOCUMENTS

| | | | | |
|---|---|---|---|---|
| 7,995,295 B2 * | 8/2011 | Chen | ............................. | 359/811 |
| 8,322,527 B2 * | 12/2012 | Lai | ............................. | 206/316.1 |
| 8,650,746 B2 * | 2/2014 | Wang | ............................. | 29/790 |
| 2008/0313848 A1 * | 12/2008 | Zhang et al. | ............................. | 15/405 |
| 2012/0048308 A1 * | 3/2012 | Pei | ............................. | 134/105 |
| 2013/0117963 A1 * | 5/2013 | Liu | ............................. | 15/405 |

* cited by examiner

*Primary Examiner* — Dung Van Nguyen
(74) *Attorney, Agent, or Firm* — Novak Druce Connolly Bove + Quigg LLP

(57) ABSTRACT

A dust cleaning device includes a tray, a cover assembled to the tray, and an air nozzle. The tray defines recesses for receiving lens barrels. A bottom of each of the recesses defines a through hole communicating with the lens barrel. The cover includes a main body and an inlet tube. The main body includes a top wall, a bottom wall, sidewalls, guide passages between the top and bottom walls, an inlet passage, and outlet passages. The inlet tube extends from the top wall. The guide passages criss-cross and communicate with each other. The sidewalls shield the guide passages. The inlet passage communicates with an inside of the inlet tube and one of the guide passages. The outlet passages communicate with the guide passages and are exposed at the bottom wall. The outlet passages are aligned with the respective recesses. The air nozzle is mounted in the inlet tube.

9 Claims, 6 Drawing Sheets

DUST CLEANING DEVICE

BACKGROUND

1. Technical Field

The present disclosure relates to cleaning devices, and particularly to a dust cleaning device for cleaning workpieces by blowing air.

2. Description of Related Art

A lens module includes a lens barrel and a number of optical elements. If there is dust in the lens barrel, the dust may deposit on the optical elements during assembly of the lens module. This results in a poor quality of the lens module.

Therefore, it is desirable to provide a dust cleaning device to overcome or at least alleviate the above-mentioned problems.

DETAILED DESCRIPTION

Figure 1:
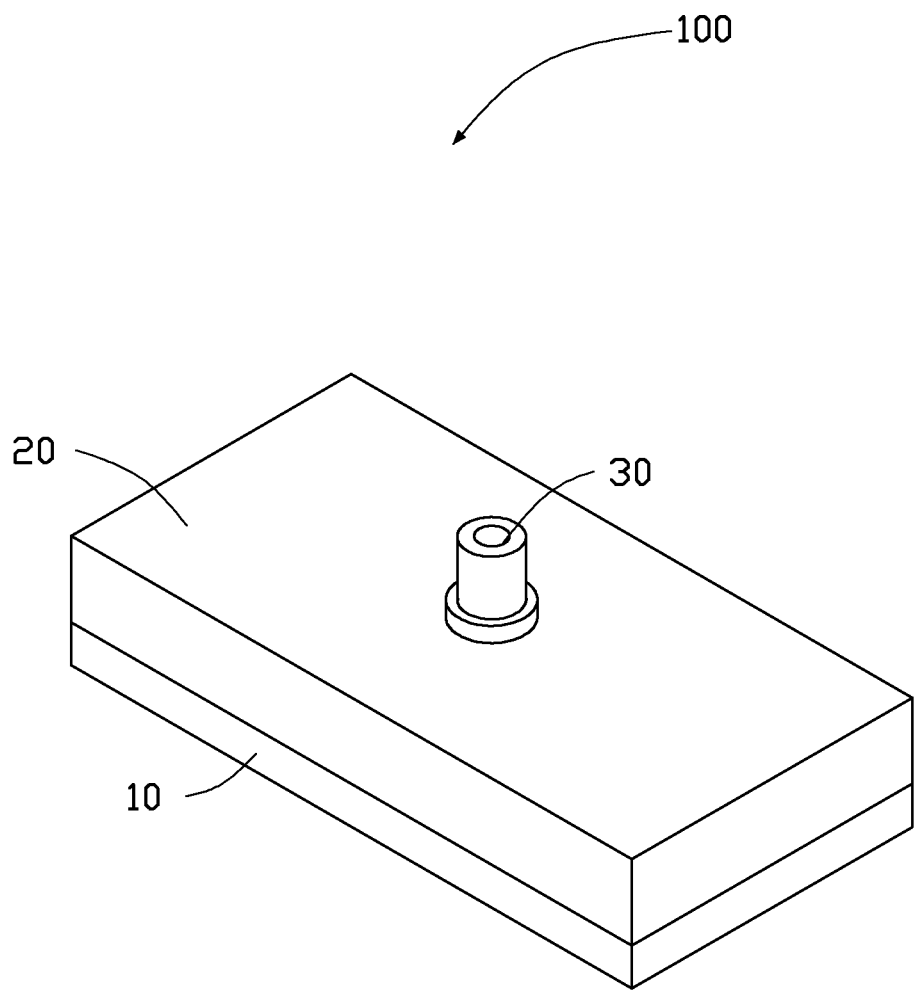
FIG. 1 is a schematic, isometric view of a dust cleaning device, according to an exemplary embodiment.

FIG. 1 shows a dust cleaning device 100, according to an exemplary embodiment. The dust cleaning device 100 includes a tray 10, a cover 20, and an air nozzle 30. The dust cleaning device 100 is configured to remove dust from inside of a lens barrel 40 (shown in FIG. 5).

Figure 2:
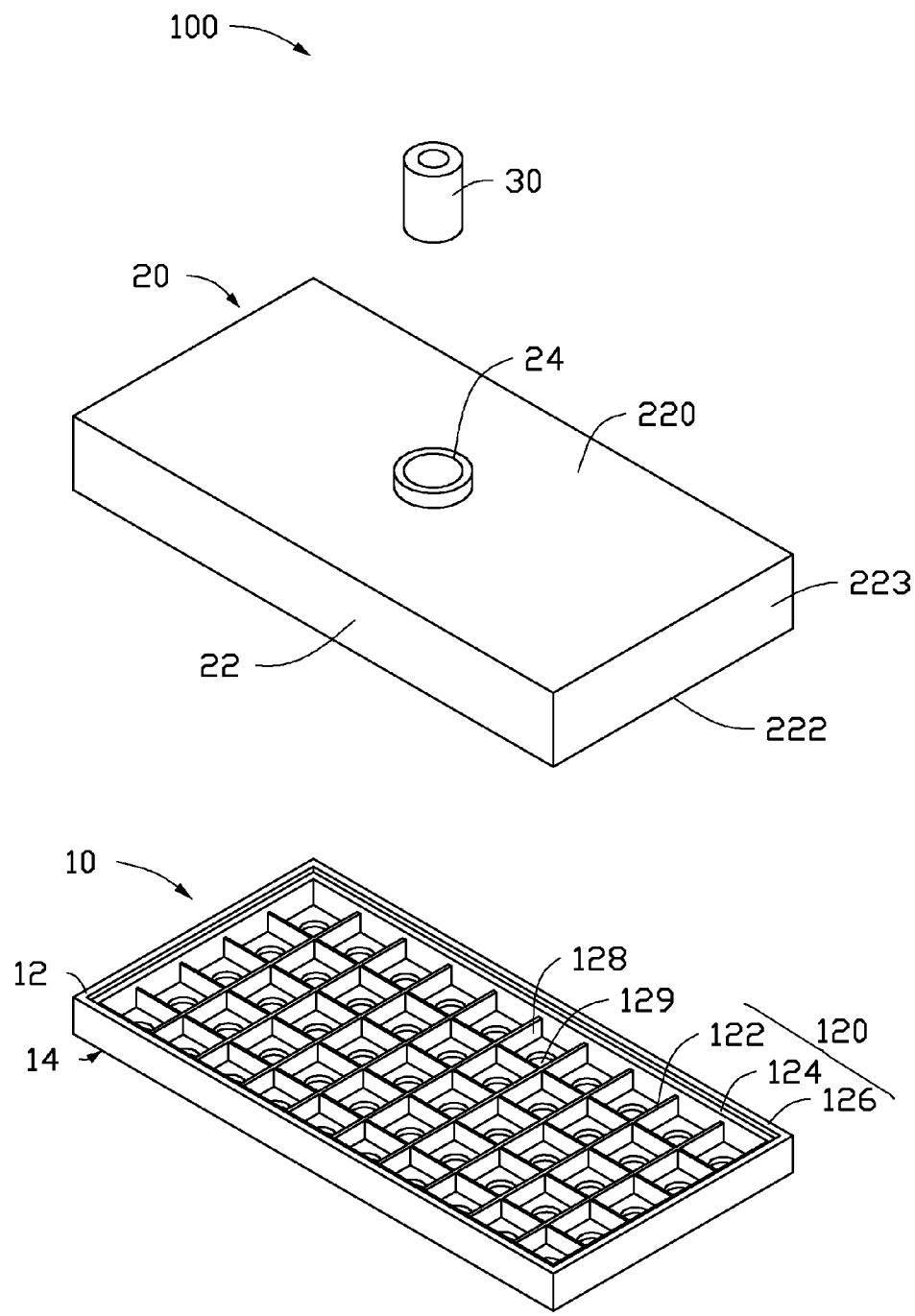
FIG. 2 is an exploded view of the dust cleaning device of FIG. 1.

FIG. 2 shows that the tray 10 is substantially cuboid. The tray 10 includes an upper side 12 and a lower side 14. The upper side 12 and the lower side 14 are located at opposite sides of the tray 10, and the upper side 12 is substantially parallel to the lower side 14. The upper side 12 includes a first stepped portion 120. The first stepped portion 120 includes a first stepped surface 122, a second stepped surface 124, and a third stepped surface 126. The first stepped surface 122 is substantially rectangular and defines a number of recesses 128. The recesses 128 are arranged in a 5×10 array. A through hole 129 is defined in a bottom of each of the recesses 128. The second stepped surface 124 is substantially a rectangular frame that surrounds the first stepped surface 122. The second stepped surface 124 is higher than the first stepped surface 122. The third stepped surface 126 is substantially a rectangular frame that surrounds the second stepped surface 124. The third stepped surface 126 is higher than the second stepped surface 124. That is, the first stepped surface 122 is nearer to the lower side 14 than the second stepped surface 124, and the second stepped surface 124 is nearer to the lower side 14 than the third stepped surface 126. In this embodiment, each through hole 129 is substantially circular.

Figure 3:
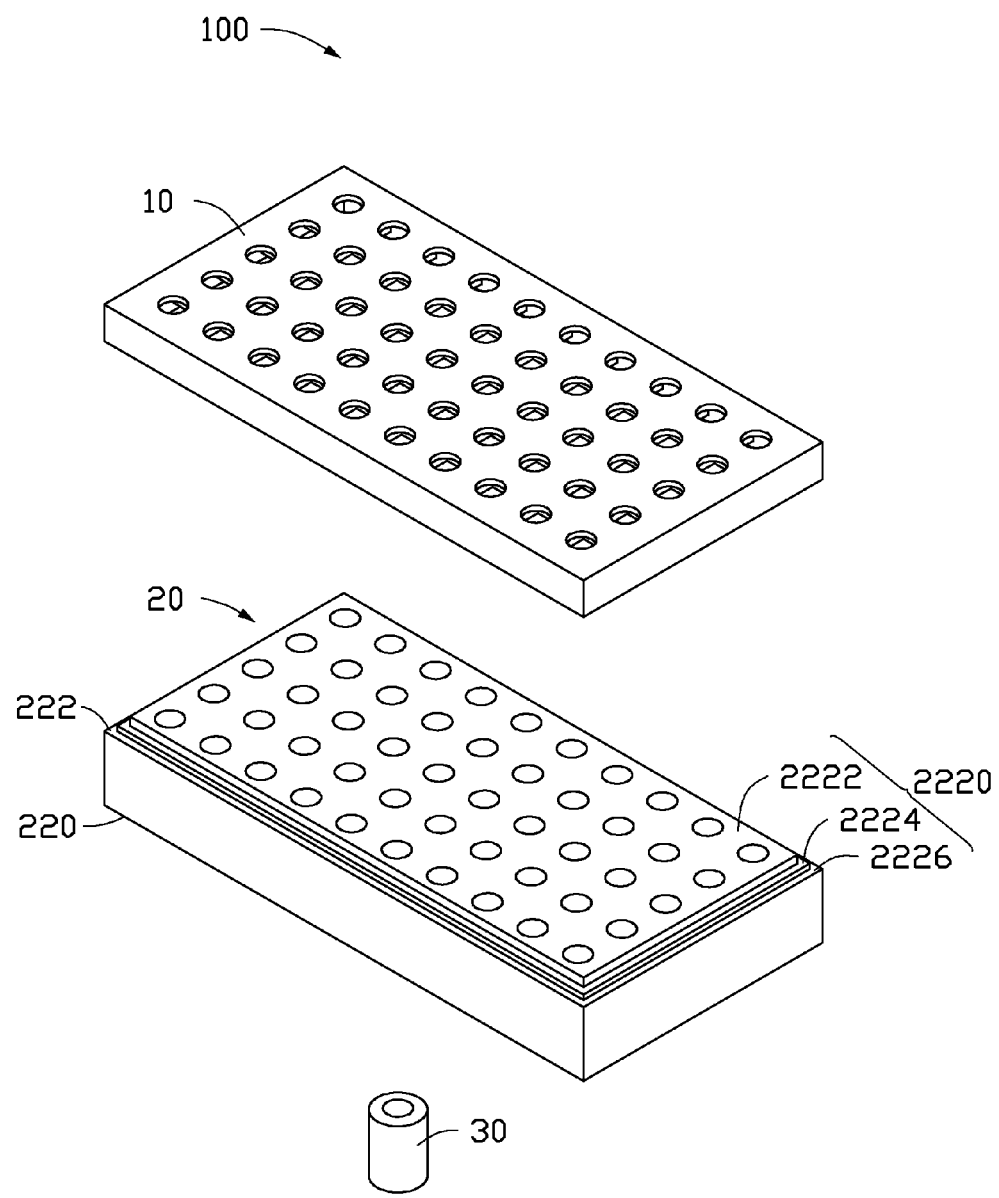
FIG. 3 is similar to FIG. 2, but viewed from another aspect.
Figure 4:
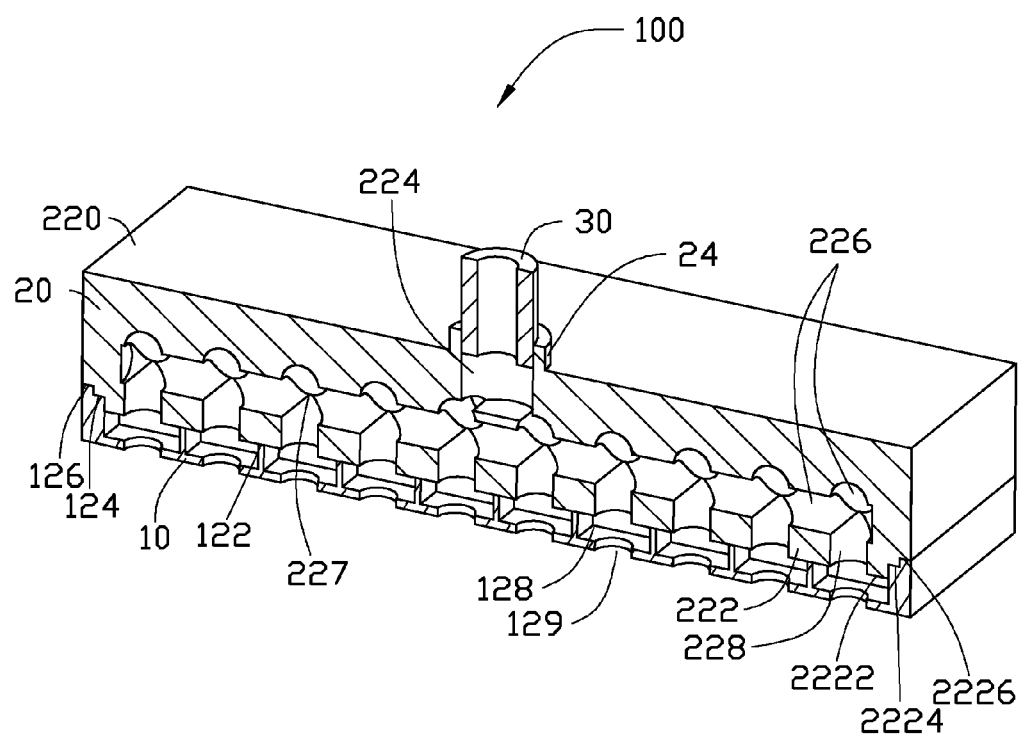
FIG. 4 is a cut-away view of the dust cleaning device of FIG. 1.

Referring to FIGS. 2-4, the cover 20 includes a main body 22 and an inlet tube 24. The main body 22 is substantially cuboid. The main body 22 includes a top wall 220, a bottom wall 222, and four sidewalls 223. The main body 22 defines an inlet passage 224, a number of guide passages 226, and a number of outlet passages 228.

The top wall 220 and the bottom wall 222 are located at opposite sides of the cover 20, and the top wall 220 is substantially parallel to the bottom wall 222. The four sidewalls 223 are connected substantially perpendicularly to each other end-to-end, and are connected substantially perpendicularly between the top wall 220 and the bottom wall 222. The inlet tube 24 extends substantially perpendicularly from the top wall 220 away from the bottom wall 222. In this embodiment, the inlet tube 24 is substantially circular and is located at a middle portion of the top wall 220.

The inlet passage 224, the guide passages 226, and the outlet passages 228 are defined inside the main body 22. In detail, the guide passages 226 are criss-cross holes inside the main body 22. The guide passages 226 include first guide passages 226 in five rows and second guide passages 226 in ten columns. The first guide passages 226 in five rows cross the second guide passages 226 in ten columns to form fifty intersecting joints 227. The intersecting joints 227 are arranged in a 5×10 array. The guide passages 226 are defined between the top wall 220 and the bottom wall 222, and are not exposed at the top wall 220, the bottom wall 222, or the four sidewalls 223. The inlet passage 224 is defined between the guide passages 226 and the top wall 220. One end of the inlet passage 224 communicates with an inside of the inlet tube 24, and the other end of the inlet passage 224 communicates with one of the guide passages 226. The outlet passages 228 are defined between the guide passages 226 and the bottom wall 222 and correspond to the intersecting joints 227. One end of each of the outlet passages 228 communicates with one of the guide passages 226 at each of the intersecting joints 227, and the other end of each of the outlet passages 228 is exposed at the bottom wall 222.

The bottom wall 222 includes a second stepped portion 2220. The second stepped portion 2220 includes a fourth stepped surface 2222, a fifth stepped surface 2224, and a sixth stepped surface 2226. The fourth stepped surface 2222 is substantially rectangular. The outlet passages 228 pass through the fourth stepped surface 2222. The fifth stepped surface 2224 is substantially a rectangular frame that surrounds the fourth stepped surface 2222. The sixth stepped surface 2226 is substantially a rectangular frame that surrounds the fifth stepped surface 2224. The fifth stepped surface 2224 is nearer to the top wall 220 than the fourth stepped surface 2222, and the sixth stepped surface 2226 is nearer to the top wall 220 than the fifth stepped surface 2224.

In other embodiments, the main body 22 and the tray 10 are substantially circular.

The air nozzle 30 is substantially cylindrical. The air nozzle 30 is mountably received in the inlet tube 24 and is configured to blow air into the inlet tube 24.

In assembly, the air nozzle 30 is mountably received in the inlet tube 24, and the cover 20 is assembled to the tray 10. In detail, the sixth stepped surface 2226 abuts and entirely overlaps the third stepped surface 126, the fifth stepped surface 2224 abuts and entirely overlaps the second stepped surface 124, and the fourth stepped surface 2222 abuts and entirely overlaps the first stepped surface 122. Thus, the outlet passages 228 are aligned with the through holes 129. In other embodiments, the cover 20 is assembled to the tray 10 with adhesive.

Figure 5:
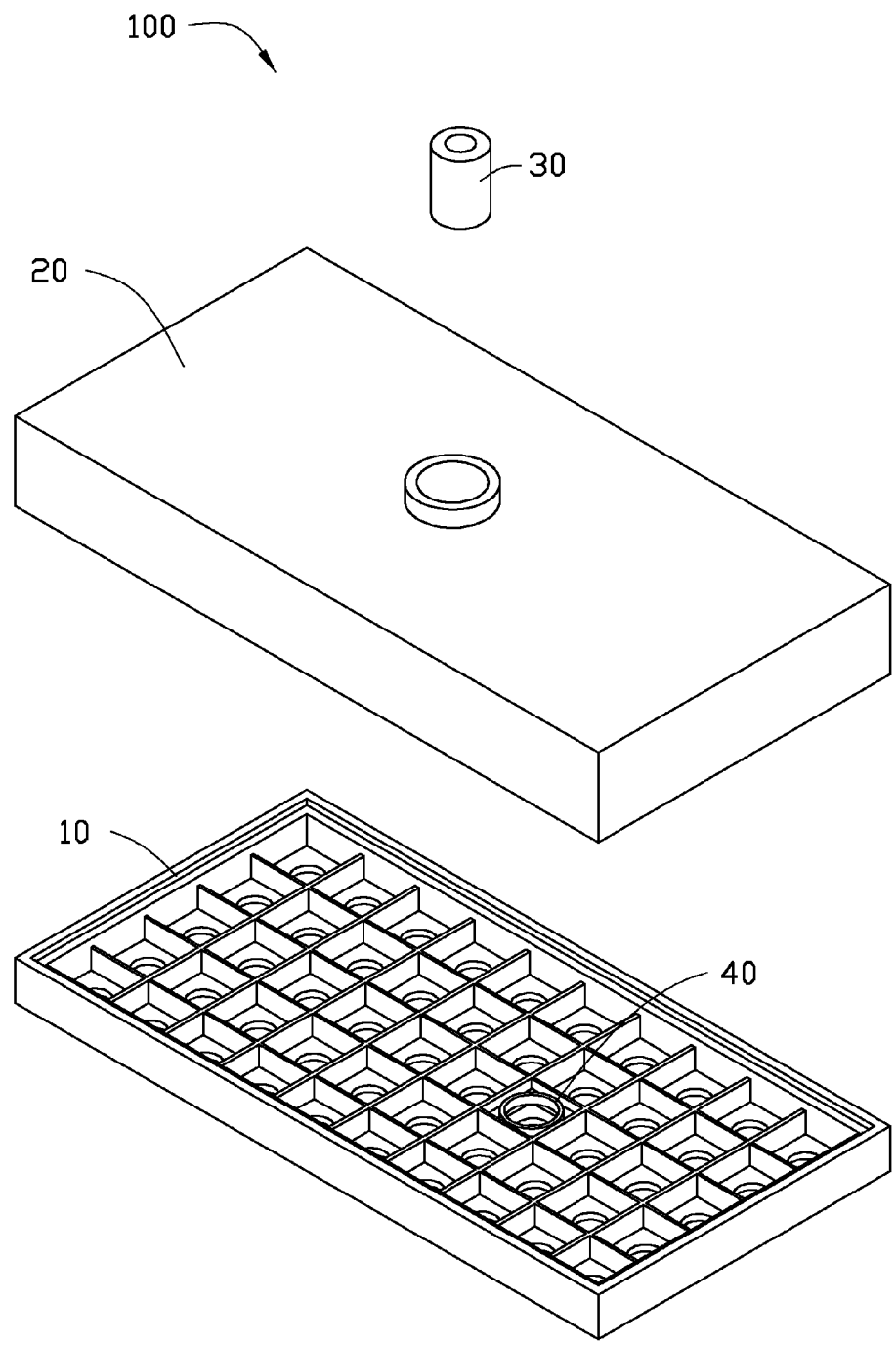
FIG. 5 is similar to FIG. 2, but shows a lens barrel received in a tray of the dust cleaning device.
Figure 6:
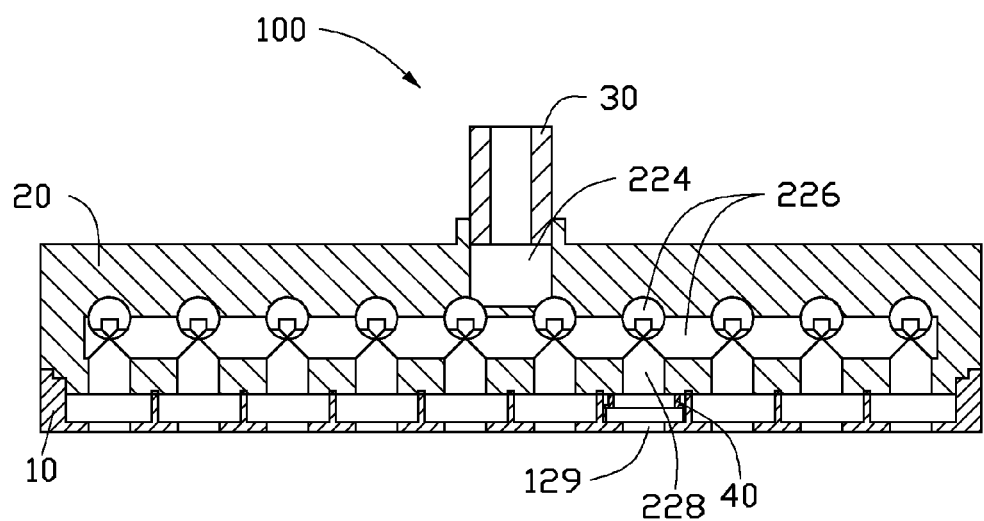
FIG. 6 is a cross-sectional view of the dust cleaning device of FIG. 1, but shows a lens barrel received in a tray of the dust cleaning device.

Referring to FIGS. 4-6, in operation, first, a number of lens barrels 40 are correspondingly received in the recesses 128, such that an inside of each of the lens barrels 40 communicates with the corresponding through hole 129. Second, the cover 20 is assembled to the tray 10. Third, the air nozzle 30 blows air into the inlet tube 24. The air sequentially passes through the inlet passage 224, the guide passages 226, and the outlet passages 228. The air is blown out of the cover 20 via the outlet passages 228 into the lens barrels 40. Dust from inside of the lens barrels 40 is removed and eliminated through the through holes 129. Therefore, the dust cleaning device 100 can clean a number of lens barrels 40 simultaneously. Thus, the cleaning efficiency of the lens barrel 40 and a quality of the lens module is increased. In addition, dust from each of the lens barrels 40 exits the tray 10 directly through the corresponding through holes 129 because four sidewalls of the corresponding recesses 128 and the fourth stepped surface 2222 prevent the dust from being blown anywhere else. Thus, cross-contamination between adjacent lens barrels 40 is prevented.

Even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A dust cleaning device comprising:
   a tray defining a plurality of recesses each for receiving a lens barrel, a bottom of each of the recesses defining a through hole for communicating with the lens barrel;
   a cover comprising a main body and an inlet tube, the main body comprising a top wall, a bottom wall opposite to the top wall, sidewalls interconnected between the top wall and the bottom wall, a plurality of guide passages between the top wall and the bottom wall, an inlet passage between the guide passages and the top wall, and a plurality of outlet passages between the guide passages and the bottom wall, the inlet tube perpendicularly extending from the top wall, the guide passages crisscrossing and communicating with each other, the sidewalls shielding the guide passages, one end of the inlet passage communicating with the inlet tube, and the other end of the inlet passage communicating with one of the guide passages, one end of each of the outlet passages communicating with one of the guide passages, and the other end of each of the outlet passages exposed at the bottom wall, the cover attached on the tray, the outlet passages aligned with the respective recesses; and
   an air nozzle mountably received in the inlet tube.

2. The dust cleaning device of claim 1, wherein the recesses are arranged in a array.

3. The dust cleaning device of claim 1, wherein the guide passages include first guide passages arranged in rows and second guide passages arranged in columns, the first guide passages in rows penetrate the second guide passages in columns to form a plurality of intersecting joints, and one end of the outlet passages communicates with the guide passages at the intersecting joints.

4. The dust cleaning device of claim 3, wherein the tray comprises an upper side and lower side opposite to the upper side, the upper side comprises a first stepped portion having a first stepped surface, a second stepped surface, and a third stepped surface, the recesses are defined in the first stepped surface, the second stepped surface surrounds the first stepped surface, the third stepped surface surrounds the second stepped surface, the first stepped surface is nearer to the lower side than the second stepped surface, the second stepped surface is nearer to the lower side than the third stepped surface, the bottom wall comprises a second stepped portion having a fourth stepped surface, a fifth stepped surface, and a sixth stepped surface, the fifth stepped surface surrounds the fourth stepped surface, the sixth stepped surface surrounds the fifth stepped surface, the sixth stepped surface is nearer to the top wall than the fifth stepped surface, the fifth stepped surface is nearer to the top wall than the fourth stepped surface, the third stepped surface abuts the sixth stepped surface, the second stepped surface abuts the fifth stepped surface, and the first stepped surface abuts the fourth stepped surface.

5. The dust cleaning device of claim 4, wherein the outlet passages are aligned with the respective through holes.

6. The dust cleaning device of claim 5, wherein the main body is substantially rectangular, and the tray is substantially rectangular.

7. The dust cleaning device of claim 5, wherein the main body is substantially circular, and the tray is substantially circular.

8. The dust cleaning device of claim 1, wherein the cover is attached on the tray with adhesive.

9. The dust cleaning device of claim 1, wherein the cover is mechanically engaged in the tray.

* * * * *